United States Patent [19]

Lampe et al.

[11] Patent Number: 5,031,398
[45] Date of Patent: Jul. 16, 1991

[54] DIRECT CONTROLLED CONTROL VALVE WITH AN OFFSET OF A DIGITAL TO ANALOG CONVERTER

[75] Inventors: Steven W. Lampe, San Diego, Calif.; Ashley W. Timmis, Bristol, Great Britain

[73] Assignee: Sundstrand Corporation

[21] Appl. No.: 443,159

[22] Filed: Nov. 30, 1989

[51] Int. Cl.$^5$ ............................................. F02C 9/28
[52] U.S. Cl. .............................. 60/39.281; 60/727; 364/431.02
[58] Field of Search ............... 60/39.24, 39.281, 727; 364/135, 431.02

[56] References Cited

U.S. PATENT DOCUMENTS

| 4,158,884 | 6/1979 | McKinley et al. | 364/431.02 |
| 4,712,372 | 12/1987 | Dickey et al. | 60/39.281 |
| 4,718,229 | 1/1988 | Riley | 60/39.281 |
| 4,777,793 | 10/1988 | Weigand et al. | 60/727 |

Primary Examiner—Louis J. Casaregola
Attorney, Agent, or Firm—Antonelli, Terry, Stout & Kraus

[57] ABSTRACT

A fuel control system (10) for a power unit used for generating power used for operating an airframe in accordance with the invention includes an air supply (18) for supplying pressurized air blown down from a storage vessel (14) to a combustor (16) which generates a gas stream by burning fuel supplied by a fuel supply (32) driving a turbine (50) to produce the power; a pressure sensor (26) coupled to the air supply for producing an analog signal proportional to pressure upstream in the air supply from the combustor; a digital to analog converter (54) having an offset input coupled to a signal proportional to the sensed pressure, a digital input for receiving a digital input signal, and an analog output which varies in proportion to the sum of the signal applied to the offset input and the digital input signal; a fuel control valve (38) contained with the fuel supply which is controlled as a function of the analog output signal of the digital to analog converter; an analog to digital converter (56) having at least one input and at least one output with the analog to digital converter outputting a digital signal proportional to each input signal applied to the at least one input of the analog to digital converter; and a system controller (24), responsive to the at least one output of the analog to digital converter, controlling the fuel with a periodically generated digital input signal applied to the digital to analog converter.

8 Claims, 1 Drawing Sheet

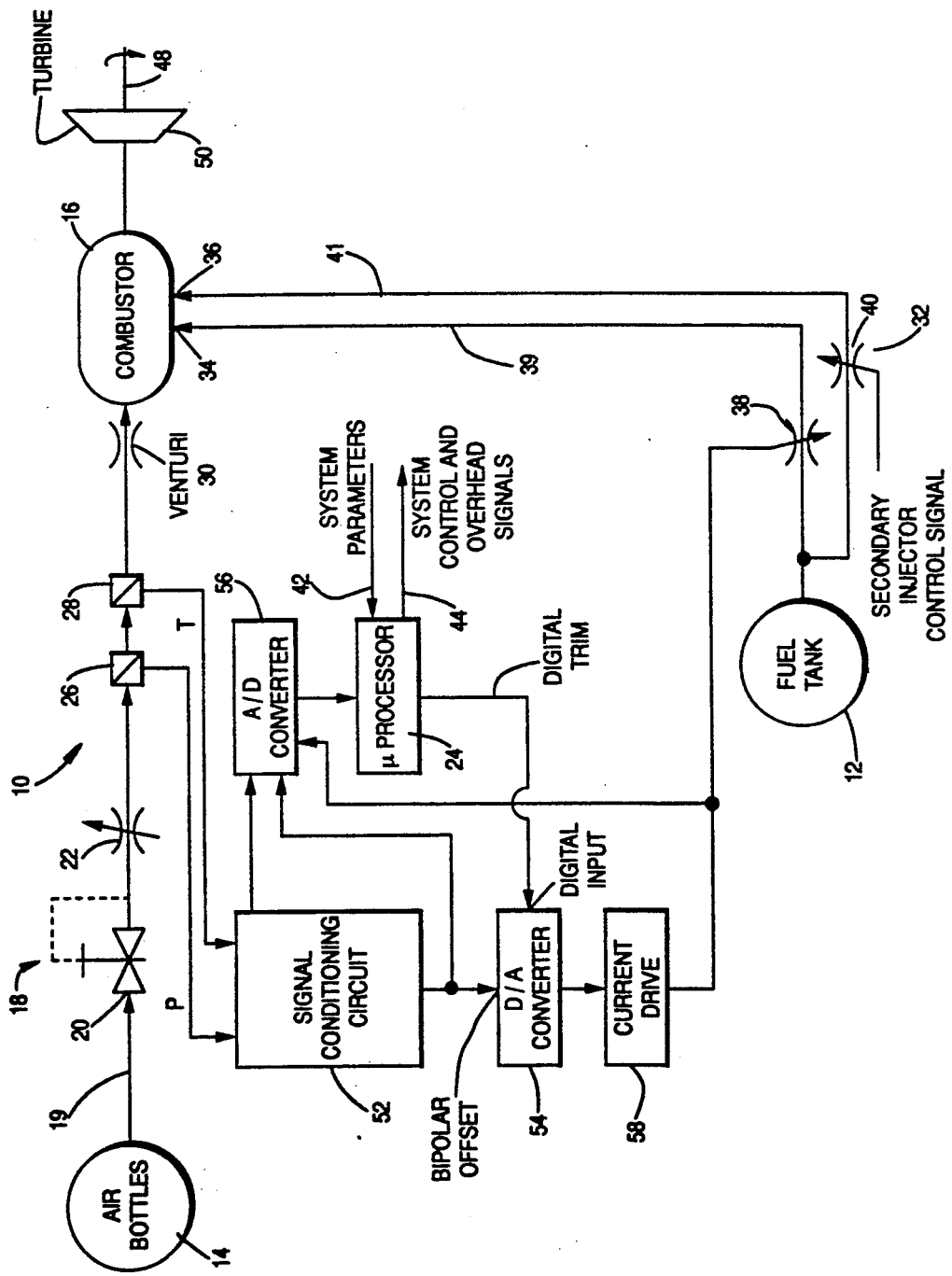

DIRECT CONTROLLED CONTROL VALVE WITH AN OFFSET OF A DIGITAL TO ANALOG CONVERTER

DESCRIPTION

1. Technical Field

The present invention relates to control systems which utilize a digital to analog converter for controlling a system control in response to a digital input to the digital to analog converter which is updated at a rate less than a time varying system parameter which causes the system control to vary.

2. Background Art

Digital to analog converters are commercially available which have a bipolar offset which causes the analog output of the converter to vary in proportion to a signal which varies positively or negatively that is the applied bipolar offset. A commercially available digital to analog converter of the foregoing type is the HI-565A digital to analog converter manufactured by Harris Semiconductor.

Emergency power units (EPU) are power generating systems which produce hydraulic and/or electrical power for use in powering electrical and hydraulic components in an airframe during emergencies. The assignee of the present invention manufactures EPUs which utilize a two-stage combustor which combusts JP 4 jet fuel within a primary combustion zone where pressurized air blown down for air bottles is mixed with the fuel rejected by a primary fuel injector. A secondary fuel injector inputs JP 4 fuel into a secondary zone for noncombustive cooling the resultant hot stream of combustion gasses prior to impingement on a turbine rotor which is connected to an electrical and/or hydraulic power generator for generating the aforementioned electrical and/or hydraulic power. The aforementioned combustors manufactured by the assignee of the present invention operate with the primary injector being controlled to produce a constant air to fuel ratio which is stoichiometric.

DISCLOSURE OF INVENTION

The present invention provides a control system for controlling a system control which varies in response to a sensed system parameter that varies between successive outputs of a digital input to a digital to analog converter which produces an output signal controlling the system control. The present invention applies the sensed system parameter to the bipolar offset of a digital to analog converter to continuously vary the output of the digital to analog converter in proportion to the sensed system parameter which varies between successive new digital inputs to the digital to analog converter. By applying the sensed system parameter to the bipolar offset input of the digital to analog converter, the system controller is relieved of the processing overhead which would be required to vary the digital input to the digital to analog converter at a real time rate equal to the variation of the sensed system parameter. Accordingly, the system controller may perform other functions in the system with the overhead of the system control being shared jointly by the digital to analog converter and the system controller. A preferred embodiment for implementing the present invention is in a fuel control system in an EPU or an integrated power unit (IPU) used for generating emergency hydraulic and/or electrical power in an airframe.

A control system in accordance with the present invention includes at least one first sensor, each first sensor being responsive to a system parameter which is time varying and producing an output signal proportional to the system parameter; a digital to analog converter having an offset input coupled to a signal proportional to the system parameter, a digital input for receiving a digital input signal and, an analog output which varies in proportion to the sum of the signal applied to the offset input and the digital input signal; a system control which is controlled as a function of the analog output of the digital to analog converter; an analog to digital converter having at least one input and at least one output with the analog to digital converter outputting a digital signal proportional to each input; and a system controller, responsive to the at least one output of the analog to digital converter, controlling the system control with a periodically generated digital input signal applied to the digital to analog converter which is a function of at least one output signal of the analog to digital converter. The analog to digital converter has an input to which is applied a signal which is a function of the control signal applied to the system control and outputs a digital signal which is a function of the control signal to an input of the controller; and the controller periodically updates the digital signal which is the input to the analog to digital converter to be equal to a calculated value which is a function of the digital signal which is a function of the control signal.

The invention further includes at least one second sensor, each second sensor being responsive to a system parameter varying more slowly than any system parameter sensed by the at least one first sensor and producing an output signal, a signal proportional to the output of each second sensor being coupled to an input of the analog to digital converter; and wherein the analog to digital converter converts each signal proportional to the output of each second sensor to a digital signal which is coupled to the controller; and the controller periodically updates the digital signal which is the input to the digital to analog converter with the calculated value as a function of at least one digital signal coupled to the controller from the analog to digital converter. The controller may be a programed microprocessor.

A fuel control system for a power unit used for generating power used for operating an airframe in accordance with the invention includes an air supply for supplying pressurized air blown down from a storage vessel to a combustor which generates a gas stream by combusting fuel supplied by a fuel supply driving a turbine to produce the power; a pressure sensor coupled to the air supply for producing an analog signal proportional to pressure upstream in the air supply from the combustor; a digital to analog converter having an offset input coupled to a signal proportional to the sensed pressure, a digital input for receiving a digital input signal and an analog output which varies in proportion to the sum of the signal applied to the offset input and the digital input signal; a fuel control valve contained within the fuel supply for controlling fuel flow into the combustor which is controlled as a function of the analog output signal of the digital to analog converter; an analog to digital converter having at least one input and at least one output with the analog to digital converter outputting a digital signal proportional to each input signal applied to the at least one input of the analog to digital converter; and a system controller, responsive to at least one output of the analog to digital converter, controlling the fuel control valve with a periodically generated digital input signals applied to the digital to analog converter. The analog to digital converter has an input to which is applied a signal which is a function of the control signal applied to the fuel control valve and outputs a digital signal which is a function of the control signal; and the controller periodically updates the digital signal which is the input to the analog to digital converter to be equal to a calculated value which is a function of the digital signal that is a function of the control signal.

The invention further includes a temperature sensor for producing a signal proportional to the temperature upstream of the air supply from the combustor, a signal proportional to the temperature being coupled to an input of the analog to digital converter; and wherein the analog to digital converter converts the signal proportional to the temperature to digital; and, the controller updates the calculated value is produced by calculating a value of the equation $$\frac{P}{\sqrt{T}} * K$$

wherein T is the sensed temperature, P is the sensed pressure, and K is a constant which is determined by the system characteristics. The controller may be a programmed microprocessor.

A method for controlling a system control in accordance with the invention includes periodically providing an updated digital input signal to a digital input of a digital to analog converter having an offset input and an output which outputs an analog signal proportional to a sum of the digital signal and an offset signal applied to offset input; sensing a system parameter which varies between the periodic providing of the digital input signal; and continuously applying a signal which is a function of the sensed system parameter as the offset input. A signal, which is a function of a control signal of the system control and a signal which is a function of the sensed system parameter are applied as inputs to an analog to digital converter which outputs digital signals proportional to the applied signal to the controller; and the controller periodically updates the digital input to the analog to digital converter to be equal to a calculated value which is a function of the output digital signals.

BRIEF DESCRIPTION OF DRAWINGS

The Figure illustrates a fuel control system in accordance with the present invention.

BEST MODE FOR CARRYING OUT THE INVENTION

The Figure illustrates a block diagram of an embodiment 10 in accordance with the present invention. The embodiment 10 is part of an EPU or IPU which is used for generating emergency hydraulic and/or electrical power in an airframe when a failure has occurred with on-board hydraulic and/or electrical power generating equipment. The electrical and hydraulic power equipment (not illustrated) is driven by the output 48 of the turbine 50. The embodiment 10 generates power by combustion of jet fuel (JP 4) which is stored in a fuel tank 12 in a combustor 16 which generates a high pressure gas stream that drives the rotor of the turbine 50.

The combustor 16 receives compressed air blown down from an air supply 18 comprised of one or more air bottles 14, a conduct 19 connecting the air bottles to the combustor, an on/off valve and regulator 20, air control valve 22 which receives a control signal from a system controller 24 which may be a programmed microprocessor, pressure sensor 26, temperature sensor 28 and choked venturi 30 disposed within the conductor. The choked venturi 30 has an inlet pressure at least 1.2 times as great as the outlet pressure so that fuel ignition in the turbine 50 does not affect mass flow upstream from the venturi. The control line from the system controller 24 to the air control valve is not illustrated for purposes of illustration. The pressure sensor 26 may be a device which varies in producing an output voltage a ranging from 0 to 25 millivolts in proportion to the pressure upstream from the venturi 30. The temperature sensor 28 may be resistive thermal device which functions as a varistor having a resistance which varies in direct proportion to the sensed temperatures upstream of venturi 31. Fuel supply 32 conducts fuel from fuel tank 12 to a primary fuel injector 34 and to a secondary fuel injector 36. A fuel pump has been omitted from illustration. It should be noted that the overall structure of the combustor 16 and the primary fuel injector 34 and secondary fuel injector 36 are shown only schematically with a suitable structure for implementing the combustor and the injectors being the type of combustor marketed by the assignee of the present invention. A fuel control valve 38 is disposed in line in the fuel supply 32 in the primary fuel line 39 between the fuel tank 12 and the primary fuel injector 34. The fuel control valve 38 modulates the quantity of fuel injected into the primary combustion zone of the combustor 16 in accordance with a control signal which is produced by the present invention as described below. Additionally, a secondary fuel valve 40 is disposed in fuel line 41 between the fuel tank 12 and the secondary fuel injector 36. The quantity of fuel passed by the secondary fuel valve 40 is controlled by a control signal applied to the secondary fuel valve by the microprocessor 24. The control of the secondary fuel valve may be in accordance with control algorithms utilized by the assignee's commercial combustors. Additionally, the secondary fuel valve 32 may be controlled by a closed loop control of combustor exhaust temperature as a control variable or by maintaining a constant overall (primary plus secondary) air to fuel ratio. It should be understood that the control valves 38 and 40 may be an integral part of injectors 34 and 36 respectively.

The electronic processing circuitry of a control system of the present invention is described as follows. The microprocessor 24 functions to calculate periodically a digital trim input to the digital to analog converter 54 which controls the primary fuel valve 38 with the control signal being a function of the calculation of a value to the equation $$\frac{P}{\sqrt{T}} * K$$

where P is the sensed pressure, and T is the sensed temperature. The microprocessor 24 receives a plurality of system parameters collectively indicated by input 42 which may be from sensors monitoring performance or fault detectors etc. It should be understood that a single line 42 symbolically identifies the aforementioned plurality of inputs. The microprocessor 24 outputs a plurality of output system control and overhead signals which are collectively identified by reference number 44. The microprocessor 24 has a substantial processing overhead not pertaining to control of the control valve 38 involving monitoring of the operation of the entire system including the power outputs from the hydraulic and electrical power generating system driven by the output 48 of the turbine 50. As a consequence of the substantial non-control overhead as well as control overhead, the microprocessor 24 performs a plurality of routines which make it preferable to not have a processing overhead for outputting the digital trim signal from the microprocessor 24 on a real time basis with a frequency equal to the time varying pressure output from the pressure sensor 26. In an EPU the pressure upstream from the combustor 16 varies rapidly with the variation in pressure being an independent variable of the control of the primary fuel control valve 38. Proper control of the fuel valve 38 requires that the variation of the pressure sensed by the pressure sensor 26 is used as an independent control variable on a real time basis. The temperature output signal from the temperature sensor 28 varies much more slowly than the pressure output signal from the pressure sensor 26 and as a result temperature variation is not required as a real time variable in the control of the fuel valve 38.

Signal conditioning circuit 52 provides the output signals from the pressure sensor 26 and the temperature sensor 28 as follows. The output signal from the pressure sensor 26 which may be a signal having a range of 0–25 millivolts varying in direct proportion to the pressure, is converted by the signal conditioning circuit to a signal suitable for driving the bipolar offset input of a digital to analog converter 54 and an input to analog to digital converter 56. The range of the converted pressure sensor output may be 0–10 volts. The signal conditioning circuit 52 converts the output from the temperature sensor 28, which is a variable resistance, to a signal varying in direct proportion to the sensed temperature with a dynamic range such as 0–10 volts and applies the converted signal to the analog to digital converter 56. Current drive 58 amplifies the analog output signal from the digital to analog converter 54 to a suitable level to drive the primary fuel valve 38. The output of the current drive 58 is also applied as an input to the analog to digital converter 56. The analog to digital converter 56 functions to output digital output signals to the microprocessor 24 which are proportional to the analog input signals outputted by the signal conditioning circuit 52 which are a function of the signals produced by the pressure sensor 26 and the temperature sensor 28 and from the output of the current drive 58. The output signals from the analog to digital converter 56 produced from the various inputs may be applied to the microprocessor 24 in a time multiplexed manner.

The fuel control system 10 of the present invention operates as follows. Once the combustion process is initiated in the combustor 16, the primary fuel control valve 38 is controlled by the output from the current drive 58. As a consequence of rapid pressure perturbations which occur in the air supply 18, the output signal from the pressure sensor 26 varies at a frequency much higher than the data rate at which the microprocessor 24 updates the digital input to the digital to analog converter 54 either on a synchronous or an asynchronous basis to the digital input of the digital to analog converter 54. For example the time interval between successive calculations of the aforementioned equation may be every 10 milliseconds or alternatively the time interval may vary with each new calculation of the digital trim signal in accordance with the aforementioned equation in response to an interrupt. During the time interval between each new calculation of the aforementioned equation as the digital input to the digital to analog converter 54 the microprocessor 24 is receiving system parameters on one or more lines 42 and expending substantial processing in outputting system controls and overhead on one or or more lines 44. A signal which is proportional to the sensed pressure P produced by the signal conditioning circuit 52 is coupled to the bipolar offset input of the digital to analog converter 54 on a real time basis. The digital to analog converter 54 functions during the interval between subsequent calculations of the aforementioned equation to produce a real time varying output signal which is proportional to the sum of a signal which is a function of the rapidly varying pressure signal P outputted by the pressure transducer 26 and the previously applied digital input outputted by the microprocessor 24. Thereafter, synchronously or on an interrupt basis the microprocessor calculates a solution to the aforementioned equation.

$$\frac{P}{\sqrt{T}} * K.$$

The microprocessor 24 compares the calculated solution to the aforementioned equation with the actual current drive from the current drive 58 which is inputted to the analog to digital converter 56 and updates the digital trim input to the digital signal input to produce an output from the current drive 58 agreeing with the output from the current drive just before the new calculation of a value of the equation by the microprocessor.

While the invention has been described in terms of its preferred embodiment, it should be understood that the invention is not limited to applications of fuel control for EPUs or IPUs. The invention may be practiced in applications which require system control in which one independent system control variable varies more rapidly than one or more additional system independent control variables with the bipolar offset of a digital to analog converter being used to provide the more rapidly varying independent variable on a real time basis to remove processing overhead from a system controller controlling the system control consequent from processing the rapidly varying independent variable in producing a control signal for the system control.

We claim:

1. A control system comprising:
    at least one first sensor, each first sensor being responsive to a system parameter which is time varying and producing an output signal proportional to the system parameter;
    a digital to analog converter having an offset input coupled to a signal proportional to a system parameter, a digital input for receiving a digital input signal, and an analog output which varies in proportion to the sum of the signal applied to the offset input and a digital input signal;
    a system control which is controlled as a function of the analog output of the digital to analog converter;
    an analog to digital converter having at least one input and at least one output with the analog to digital converter outputting a digital signal proportional to each input signal; and a system controller, responsive to the at least one output of the analog to digital converter, controlling the system control with a periodically generated digital input signal applied to the digital to analog converter which is a function of at least one output signal of the analog to digital converter.

2. A control system in accordance with claim 1 wherein:

the analog to digital converter has an input to which is applied a signal which is a function of a control signal applied to the system control and outputs a digital signal which is a function of the control signal to an input of the controller; and the controller periodically updates the digital signal which is the input to the digital to analog converter to be equal to a calculated value which is a function of the digital signal which is a function control signal.

3. A control system in accordance with claim 2 further comprising:

at least one second sensor, each second sensor being responsive to a system parameter varying more slowly than any system parameter sensed by the at least one first sensor and producing an output signal, a signal proportional to the output of each second sensor being coupled to an input of the analog to digital converter; and wherein the analog to digital converter converts each signal proportional to the output of each second sensor to a digital signal which is coupled to the controller; and the controller periodically updates the digital signal which is the input to the digital to analog converter with the calculated value as a function of at least one digital signal coupled to the controller from the analog to digital converter.

4. A control system in accordance with claim 1 wherein:

the controller is a programmed microprocessor.

5. A fuel control system for a power unit used for generating power used for operating an airframe in an emergency comprising:

an air supply for supplying pressurized air blown down from a storage vessel to a combustor which generates a gas stream by combusting fuel supplied by a fuel supply driving a turbine to produce the power;

a pressure sensor coupled to the air supply for producing an analog signal proportional to pressure upstream in the air supply from the combustor;

a digital to analog converter having an offset input coupled to a signal proportional to the sensed pressure, a digital signal which is the input for receiving a digital input signal, and an analog output which varies in proportion to the sum of the signal applied to the offset input and a digital input signal;

a fuel control valve contained within the fuel supply for controlling fuel flow into the combustor which is controlled as a function of the analog output signal of the digital to analog converter;

an analog to digital converter having at least one input and at least one output with the analog to digital converter outputting a digital signal proportional to each input signal applied to the at least one input of the analog to digital converter; and a system controller, responsive to the at least one output of the analog to digital converter, controlling the fuel control valve with a periodically generated digital input signal applied to the digital to analog converter.

6. A fuel control system in accordance with claim 5 wherein:

the analog to digital converter has an input to which is applied a signal which is a function of the control signal applied to the fuel control valve and outputs a digital signal which is a function of the control signal; and the controller periodically updates the digital signal which is the input to the digital to analog converter to be equal to a calculated value which is a function of the digital signal that is a function of the control signal.

7. A fuel control system in accordance with claim 6 further comprising:

a temperature sensor for producing a signal proportional to temperature upstream of the air supply from the combustor, a signal proportional to the temperature being coupled to an input of the analog to digital converter; and wherein the analog to digital converter converts the signal proportional to the temperature to digital; and the calculated value is produced by calculating a value of the equation $$\frac{P}{\sqrt{T}} * K$$

wherein N is the rotational speed of the turbine inputted to the controller, T is the sensed temperature, P is the sensed pressure and K is a constant which is determined by system characteristics.

8. A fuel control system in accordance with claim 5 wherein:

the controller is a programmed microprocessor.

* * * * *